United States Patent
Zhao et al.

(10) Patent No.: US 7,571,404 B2
(45) Date of Patent: Aug. 4, 2009

(54) FAST ON-CHIP DECOUPLING CAPACITANCE BUDGETING METHOD AND DEVICE FOR REDUCED POWER SUPPLY NOISE

(75) Inventors: Min Zhao, College Station, TX (US); Rajendran V. Panda, Round Rock, TX (US); Savithri Sundareswaran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 140 days.

(21) Appl. No.: 11/566,915

(22) Filed: Dec. 5, 2006

(65) Prior Publication Data

US 2008/0134103 A1 Jun. 5, 2008

(51) Int. Cl.
*G06F 17/50* (2006.01)
*G06F 9/45* (2006.01)

(52) U.S. Cl. .................. 716/5; 716/1; 716/2; 716/6; 716/18; 703/13; 703/14

(58) Field of Classification Search .............. 716/1–2, 716/5–6, 8–14, 18; 703/13–22
See application file for complete search history.

(56) References Cited

U.S. PATENT DOCUMENTS

| | | | | |
|---|---|---|---|---|
| 6,523,159 B2* | 2/2003 | Bernstein et al. | ............... | 716/10 |
| 6,532,439 B2* | 3/2003 | Anderson et al. | ............. | 703/14 |
| 7,302,664 B2* | 11/2007 | Haridass et al. | ............... | 716/10 |

OTHER PUBLICATIONS

Haihua Su et al., An Algorithm for Optimal Decoupling Capacitor Sizing and Placement for Standard Cell Layouts, ISPD, Apr. 7-10, 2002, pp. 68-73, San Diego, CA, ACM.
Jingjing Fu et al., A Fast Decoupling Capacitor Budgeting Algorithm for Robust On-Chip Power Delivery, ASP-DAC, pp. 1-6.
Kai Wang et al., On-chip Power Supply Network Optimization using Multigrid-based Technique, DAC, pp. 113-118, Jun. 2-6, 2003, Anaheim, California, ACM.
Hang Li et al., Partitioning-Based Approach to Fast On-Chip Decap Budgeting and Minimization, DAC, pp. 170-175, Jun. 13-17, 2005, Anaheim, California, ACM.
Zhenyu Qi et al., On-Chip Decoupling Capacitor Budgeting by Sequence of Linear Programming, 6th International Conference on ASIC, 2005.
Shiyou Zhao et al., Decoupling Capacitance Allocation for Power Supply Noise Suppression, ISPD, Apr. 1-4, 2001, Sonoma, California, ACM.

(Continued)

*Primary Examiner*—Thuan Do
*Assistant Examiner*—Nghia M Doan
(74) *Attorney, Agent, or Firm*—Dillon & Yudell LLP (57) ABSTRACT

A semiconductor power network decoupling capacitance (decap) budgeting problem is formulated to minimize the total decap to be added to the network subject to voltage constraints on the network nodes of a semiconductor circuit design. Voltage constraints on the decap to be added are taken into consideration such that the decap can be distributed throughout a hot spot region of the semiconductor circuit design and not be limited to placement at a single location in the circuit. Dynamic network voltages are at all times maintained greater than a user-specified threshold voltage level.

20 Claims, 4 Drawing Sheets

OTHER PUBLICATIONS

Haihua Su et al., An Algorithm for Optimal Decoupling Capacitor Sizing and Placement for Standard Cell Layouts, ISPD, Apr. 7-10, 2002, pp. 68-73, San Diego, CA, ACM.

Jingjing Fu et al., A Fast Decoupling Capacitor Budgeting Algorithm for Robust On-Chip Power Delivery, ASP-DAC, pp. 1-6. 2004, IEEE.

Kai Wang et al., On-chip Power Supply Network Optimization using Multigrid-based Technique, DAC, pp. 113-118, Jun. 2-6, 2003, Anaheim, California, ACM.

Hang Li et al., Partitioning-Based Approach to Fast On-Chip Decap Budgeting and Minimization, DAC, pp. 170-175, Jun. 13-17, 2005, Anaheim, California, ACM.

Zhenyu Qi et al., On-Chip Decoupling Capacitor Budgeting by Sequence of Linear Programming, 6th International Conference on ASIC, 2005.

Shiyou Zhao et al., Decoupling Capacitance Allocation for Power Supply Noise Suppression, ISPD, Apr. 1-4, 2001, Sonoma, California, ACM.

* cited by examiner

FAST ON-CHIP DECOUPLING CAPACITANCE BUDGETING METHOD AND DEVICE FOR REDUCED POWER SUPPLY NOISE

BACKGROUND OF THE INVENTION

1. Field of the Invention

The invention relates generally to a device and method of determining the value and location of a decoupling capacitance to be added during the design and layout of a semiconductor circuit to optimally reduce dynamic supply voltage fluctuations during circuit operation at high frequency.

2. Description of the Related Art

As the design and layout of semiconductor circuits, or microcircuits, or chips, become more complex, and in particular, as there is an increase in complexity of very large scale integration (VLSI) layout, an increase in operational frequency and the use of supply voltage scaling, there is an ever increasing need to remove or reduce undesired noise from the semiconductor circuit design. A chip's power distribution network is a major noise source as the fluctuations in supply voltage due to the parasitic resistance, inductance and capacitance in the network alter signals' voltage levels and can cause malfunctioning of the chip's circuits. Designing a robust power distribution network for low dynamic voltage fluctuations has become a challenging task. Extremely dense and complex circuit layouts for high frequency operation necessitate reduction of these undesired noise levels, especially at some sensitive parts of circuits such as clock generators and analog circuits. In general, it is important to improve the voltage fluctuations of all critical areas (known as "hot spots") of a semiconductor circuit layout.

Static voltage drop (also commonly known as "IR drop") is usually addressed through increased metallization (reduction of resistance), pad placement, topology optimization and power-density-aware "floor planning." However, the chief technique for limiting dynamic voltage fluctuations is to place decoupling capacitors (known as "decaps", in an abbreviated manner) close to problem hot spots. But, as the fabrication process progresses up the technology nodes ladder, and increased wire resistance aggravates the supply noise problem, sufficient decoupling capacitance needs to be added to the power network. Problematically, the high leakage current in these technology nodes discourages the addition of abundant decoupling capacitance. For these reasons, dynamic supply noise needs to be addressed with a minimum amount of decap added in an optimal manner.

As understood in the art, decap budgeting and placement is a non-linear optimization problem. Several sensitivity-based techniques have been proposed whereby a sensitivity-based nonlinear quadratic program uses a compressed piecewise linear form to store adjoint sensitivity. In another proposed method in the art, the conjugate gradient (CG) method is merged with adjoint sensitivity heuristic to speed up the sensitivity calculation of the optimization solution. In another method known in the art, the problem size is reduced using the geometric multigrid concept and then by using a sequential quadratic program on the reduced grid. Its application is thus limited to regular mesh structures. In another known concept, a divide-and-conquer technique is used to reduce the size of the sensitivity-based optimization. A further known method solves the nonlinear optimization through a sequence of linear programming methods. Sensitivities to decaps are used as linear constraints in that optimization. All these known methods, concepts and techniques, however, are problematic. For example, many require calculation of sensitivities with respect to decoupling capacitance location.

Further complicating the problem, these techniques add decap and recompute sensitivity in an iterative procedure. As the complexity of one adjoint sensitivity computation is the same as one transient analysis, the iterative nonlinear optimization procedure becomes quite expensive and time consuming. In addition, the adjoint sensitivity calculation typically needs to store waveforms at every node in both the original and the adjoint networks, which may exhaust the memory resource for large networks.

Several charge-based decap estimation techniques have also been proposed in the art in the context of power supply noise-aware floor planning. An approximate lumped decoupling capacitance is estimated for each floor plan module, with an assumption that the original voltage of decoupling capacitance is a perfect VDD/GND. However, the parasitic capacitance and existing decap value are not considered in these methods, which causes inaccuracies.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the invention. The following detailed description is, therefore, not to be taken in a limiting sense, and the scope of the invention is defined only by the appended claims.

The method of the preferred embodiment eliminates the problems of the techniques found in the prior art and determines the optimal amount of and the location for decaps, to reduce dynamic supply noise in a circuit quickly and accurately. The method of the preferred embodiment proposes a novel and efficient charge-based decoupling capacitor budgeting method. Several techniques are described herein which can be used to reduce the hot spot problem size and also to have the problem size scale well with respect to the network size and the number of violation nodes of the network. Macro modeling is used and the locality effects of the decoupling capacitance, along with non-uniform tiling, are considered. By integrating the nodal equations over the violation time period of a reduced voltage level, time-consuming sensitivity calculations and nonlinear programming optimization are replaced with a much faster and more efficient sequence of linear programming steps.

The method of the preferred embodiment performs, without limitation, the steps of: (1) dividing the circuit design and layout into small areas of approximately equal area ("tiles"); (2) determining which groups of tiles have the worst voltage drop, and are therefore considered "hot spots" in need of a decap device to reduce noise to an acceptable level (i.e., to maintain a user-specified threshold voltage) in that hot spot region; (3) determining an optimal value and location for a decap device to be inserted into the hot spot region group of tiles, assuming that the entire capacitance value to be added is to be connected to the node of the tile having the largest voltage drop; and (4) distributing uniformly within the hot spot region tiles the value of the decap to be added in a manner that optimally provides the best solution for the power network and load in that hot spot region.

In the preferred embodiment, the decap budgeting problem is formulated to minimize the total decap subject to voltage constraints on the network nodes, and constraints on the decap amount are taken into consideration such that the decap can be distributed throughout a hot spot region and not limited to placement at a single location in the circuit. The preferred embodiment aims at realizing dynamic voltages that are at all times maintained greater than a user-specified threshold voltage level.

The method of the preferred embodiment uses a novel approach wherein voltage constraints and excitation currents are translated into charge-based constraints in a linear program. Since a general non-linear optimization formulation is very time consuming, the approach first linearizes the charge-based constraints through certain approximations (to be explained in greater detail below) and then performs a small number of iterations to account for the non-linearity. A small linear program is solved during each iteration of the method of the preferred embodiment. Concepts of macro modeling and effective radius of capacitance are used for problem size reduction. Through reduction, a small macro model of a network, or portion of a network, is created having few nodes, where the nodes are the potential sites for decap connection. The charge-based constraints then govern the charge transfer from the decaps to the rest of the network in the VLSI circuit.

The approach differs from prior known approaches in many respects, for example: (1) the charge basis of constraints, formed through integration of the nodal equations over a time period of interest, simplifies computations substantially. It eliminates the need to solve the nodal equations directly; (2) the size of the problem is reduced using a macro model, which is an exact equivalent of the full network, or portion of the network, of the VLSI circuit, rather than through partitioning or multigrid coarsening; and (3) the decap pre-existing in the network and the decap to be added to the network are accounted for in different ways. The intrinsic decap of devices and interconnect and pre-placed decap cells are modeled inside the macro model through their companion electrical models placed in the network before the macro modeling procedure. Any additional decap that is optimized is external to the macro model, and is connected at the model's external nodes (model nodes).

In determining the location and value of a decoupling capacitance to be added to the design and layout of a VLSI semiconductor circuit, or chip, or other semiconductor circuit, an embodiment of the method of the preferred embodiment involves, without limitation, the steps of: (1) performing a power grid simulation for a semiconductor chip's power grid, or network (described below in Section I.); (2) determining a macro model of the semiconductor chip's network (described below in Section II.); (3) performing a decoupling capacitance budgeting calculation (described below in Section III.); and (4) formulating a linear program solution for the decap budgeting calculation (described below in Section IV.) Further enhancements and embodiments of the method of the preferred embodiment are described below within each of the Sections I-IV described below, and in particular Section V.

I. Power Grid Simulation

A chip's power distribution system, known as the power grid or network, is typically modeled as a linear RLC network having independent time-varying current sources modeling the switching currents of the transistors. Simulating the RLC network typically requires solving the following system of differential equations, which is formed by a Modified Nodal Analysis (MNA) approach, as follows:

$$G \cdot x(t) + C \cdot x'(t) = b(t) \qquad (1),$$

where G is a conductance matrix, C is an admittance matrix resulting from capacitive and inductive elements, x(t) is the time-varying vector of voltages at the nodes of the RLC network and currents through inductors and voltage sources, and b(t) is the vector of independent time-varying currents and voltages from independent sources and companion models. This differential system can then be solved by reducing it to a linear algebraic system using a Backward Euler (BE) technique to arrive at the following:

$$(G + C/h) \cdot x(t) = b(t) + C/h \cdot x(t-h) \qquad (2).$$

A fixed time step, h, is used to make the left hand side (LHS) matrix stationary (that is, unchanging with time) so that its factors, which are computed once, can be reused for different time instances in a transient simulation.

II. Macro-Modeling

The entire power distribution network, or any portion of the network, can be modeled as a multi-node linear element having current transfer characteristics given by:

$$I(t) = A \cdot V(t) + S(t) \; I(t), V(t), S(t) \in R^m, A \in R^{m \times m} \qquad (3),$$

where m is the number of nodes in the model, A is the node admittance matrix, V(t) is the vector of node voltages, I(t) is the vector of currents through the model nodes from an external network into the model, and S(t) is a vector of current sources connected between each model node and the reference node. S(t) essentially brings the effect of moving all internal current sources to the model nodes. R is the domain of real numbers.

Macro modeling is the procedure of deriving equation (3) from the modified nodal equations (4) of a network, or power grid, including the intrinsic and already placed decoupling capacitors modeled through their companion models using a backward Euler technique $$\begin{bmatrix} G_{11} & G_{12} \\ G_{12}^T & G_{22} \end{bmatrix} \begin{bmatrix} U_1(t) \\ V(t) \end{bmatrix} = \begin{bmatrix} J_1(t) \\ J_2(t) + I(t) \end{bmatrix}, \quad (4)$$

where I(t) is the vector of currents through the interface, and U(t) and V(t) are voltages at the internal nodes and the model nodes respectively. G12, G11, G22 are parts of the admittance matrix which includes the companion conductance C/h of equation (2). $J_1(t)$ and $J_2(t)$ are current sources at the internal nodes and the model nodes respectively, and include the companion currents C/h·x(t−h) of equation (2).

III. Decap Budgeting

The total capacitance to be added at the network nodes is minimized, subject to the constraints that: (i) the dynamic node voltages are better than a specified threshold, (ii) the capacitance that can be added at a node is bounded, and (iii) the node voltages satisfy the MNA equations:

minimize $\Sigma_i C_i$ subject to:

$V_i^k \geq V_{thre}$, (i)

$C_i \leq C_{max,i}$, (ii)

$V_i^k$ should satisfy MNA equations for all power grid nodes i, and at all time points k. (iii)

Here, $V_{thre}$ is specified by the user and $C_{max,i}$ is set depending on local congestion and the decap amount realizable per unit area.

The steps of an embodiment used to minimize the total capacitance to be added as a decap, is described as follows:

Step 1. Run transient analysis of a portion of, or of the entire power network design, with intrinsic capacitances and decoupling capacitances that already exist in the network;

Step 2. Inspect the transient voltage waveforms and determine: (i) the regions where the voltage constraints are violated (the violation regions). A voltage violation occurs when the voltage level in a tile drops below a user-specified threshold level. (ii) the time windows during which violations occur (the violation time windows), and (iii) a set of nodes to be used for macro modeling and optimization (the sampling nodes). This step is explained in further detail below in this Section III. If no violation region is found, then optimization is completed, no further steps need be taken, and no decap need be added to the network. Otherwise, continue with Step 3;

Step 3. For each violation region found, determine the optimal amount of decap to be added at the sampling nodes. This is done by first macro modeling the network using the sampling nodes in the violation region as the model nodes, and then running several iterations of a linear program described below in Sections IV and V. For violation regions that overlap each other, the optimization for these violation regions is done simultaneously; and Step 4. Distribute the decap of the sampling nodes uniformly into the respective violation regions of the network, and then go to step 1.

Figure 1:
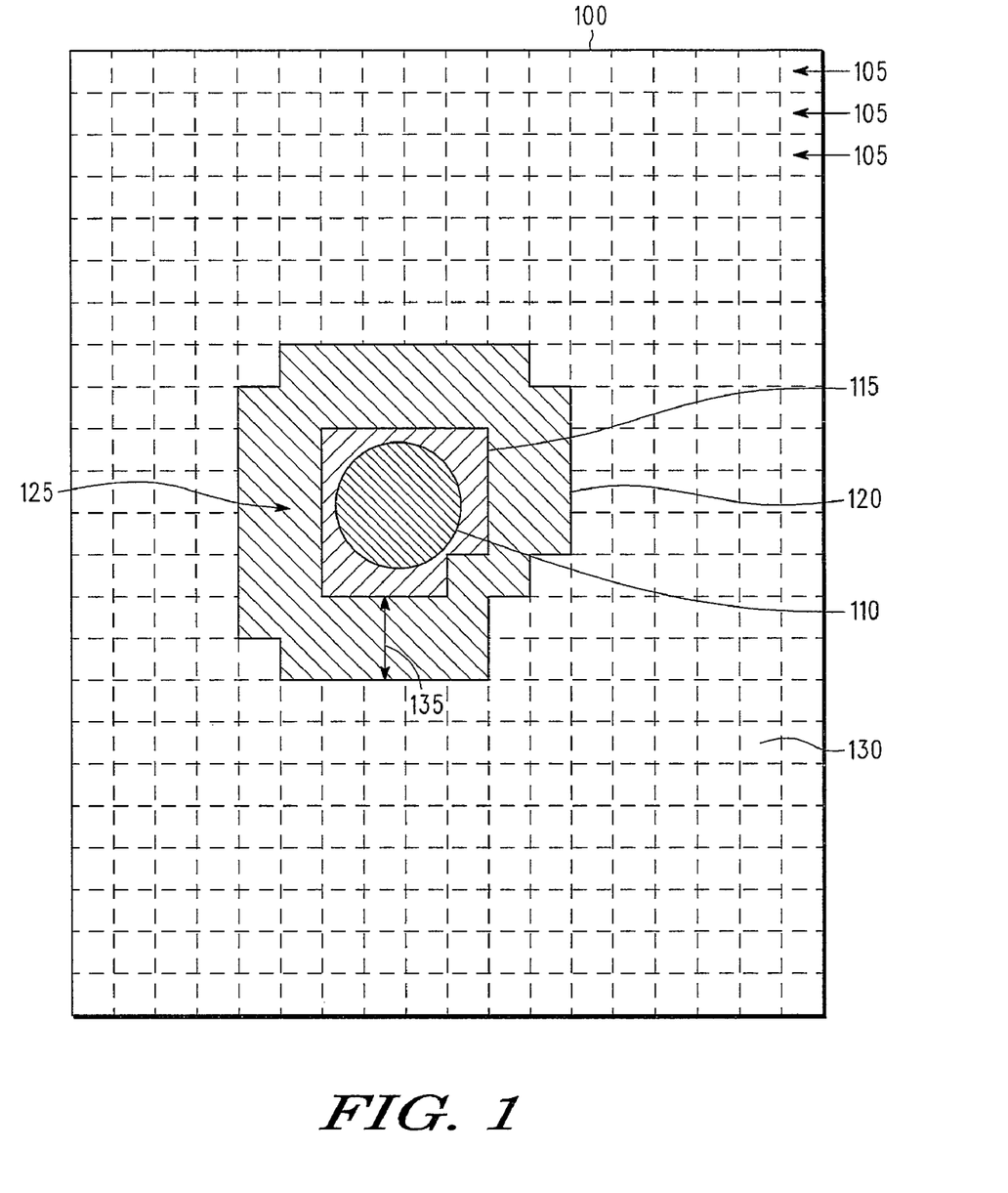
FIG. 1 is a schematic of an integrated circuit layout showing a voltage violation hot spot region according to preferred embodiments of the invention.
Figure 1A:
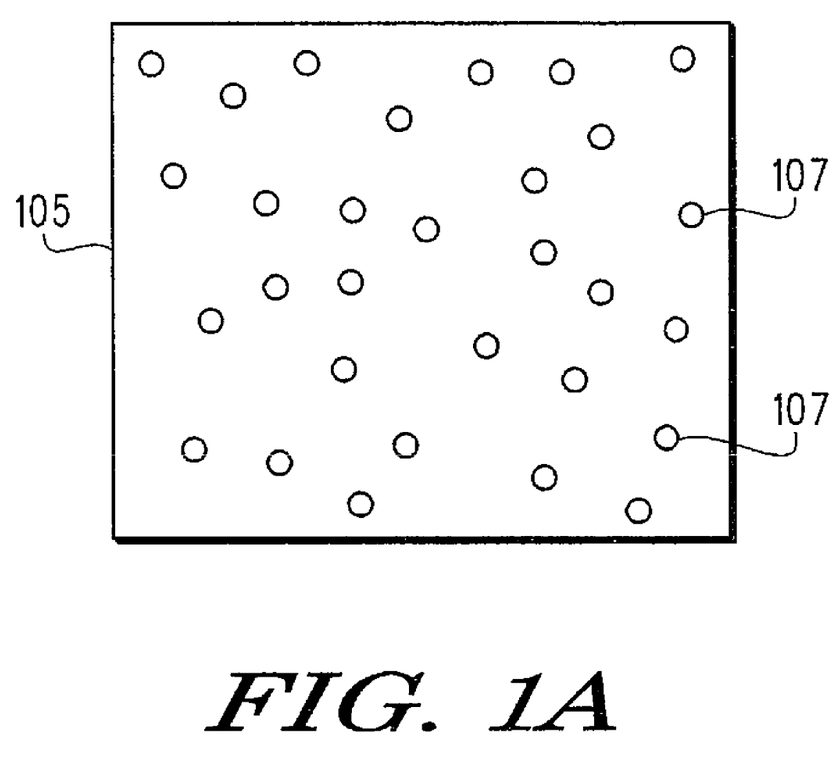
FIG. 1A is a schematic representation of an embodiment of a tile included within the integrated circuit layout of FIG. 1.

FIG. 1 illustrates the design of a semiconductor circuit, or power network, 100. Network 100 is preferably a design of a semiconductor circuit, but in other embodiments may be a physical semiconductor circuit. Network 100 is partitioned into a grid of user-specified uniformly sized tiles 105 using pre-defined x and y pitches, where the pitch is the x or y dimension of the tile 105. Each tile 105 includes a plurality of sampling nodes 107 (FIG. 1A). Tiles 105 can be squares, rectangles or other geometric shapes formed by x and y pitches. A hot spot region 110 is shown as a circular shaded area in the center of FIG. 1 and is the region of the network 100 where the user-specified voltage constraints are violated at any time instance. Hot spot region 110 may be of any shape, but is shown as a circle for simplicity in this embodiment. The set of contiguous tiles 105 which overlays the entire hot spot region 110 of network 100 defines a core violation region 115.

Core violation region 115 is then expanded in all directions by a pre-determined distance, known as the effective radius 135, to include additional tiles 105 to form an expanded violation region 120. The plurality of tiles 105 which forms the expanded violation region 120 defines a violation group of tiles 125. The effective radius 135 is the radius from the core violation region 115 within which the added decap is effective in supplying current quickly to meet the sudden current demands of the hot spot region 110. Core violation region 115 is expanded solely for the purpose of making a larger area available in which to add decap capacitance should the optimization method determine that a substantial amount of capacitance needs to be added. The trade-offs in considering a smaller versus larger (conservative) effective radius 135 are as follows:

a) a smaller effective radius 135 will limit the amount of capacitance (decap) that can be added. Thus, the optimization will be over-constrained resulting in poor quality results; and b) a larger, more conservative, effective radius 135 will allow optimization to proceed unconstrained. The optimization will automatically determine how to distribute the required decap capacitance within the expanded violation region 120. The optimization process inherently determines that more decap capacitance should be added closer to the hot spot region 110 and less capacitance should be added further from the hot spot region 110. A larger effective radius 135 requires increased time to solve the optimization, but this is not significant versus the accuracy and speed of the optimization process over prior methods.

The effective radius 135 is conservatively selected and is user-defined. Effective radius 135 essentially is a measure of how far away from the hot spot region 110 the decaps should be placed to have a reasonable effect on reducing noise within the hot spot region 110. Effective radius 135 depends on the effective resistance of a signal path (not shown), which is determined by the technology of the node 107 the current variation, and the metalization used in each layer of network 100. The effective radius 135 is measured as a number of tiles 105 which are disposed along a line from the outer boundary of the core violation region 115 to form the outer boundary of the expanded violation region 120, such that after adding decaps in the expanded region 120 the user selected threshold voltage, $V_{thre}$, would no longer be violated within the hot spot region 110.

The number of tiles (N) in the effective radius 135 is determined. If the resistance of a signal path (not shown) the length of a tile 105 is R ohms, and if a decap is located N tiles away from the hot spot region 110, then the resistance between the decap and hot spot region 110 is bounded by N*R ohms. A fraction (k), selected to be between 0.1% and 1%, of the peak current demand (I) is to be delivered to the hot spot region 110 from the farthest tile 105. The voltage drop between the decap in the farthest tile 105 and the hot spot region 110 is k*I*N*R volts. Equating that to the targeted maximum voltage drop (ΔV), then number of tiles 105 for effective radius 135 is N=ΔV/(k*I*R).

No further expansion beyond the effective radius 135 is performed, since at this point, decap added outside the expanded space of expanded violation region 120 would have little or no impact on the performance of voltages within core violation region 115. Moreover, the additional area within expanded violation region 120 provides more space to add decaps. The large area of network 100 outside the expanded violation region 120, depicted as outer network 130, can be abstracted away by reducing those nodes in outer network 130 to the macro model equations (3) and (4).

There is typically more than one violation region 120 within a network 100, though, for simplicity, only one is depicted in the FIG. 1. By running the optimization independently on additional violation regions 120 (not shown), the problem size is reduced significantly. This also brings in an opportunity for parallelization. If two or more violation regions 120 overlap each other, then these regions are optimized together simultaneously. Optimizing them separately in such cases would result in sub-optimal results since the strong interaction of capacitances and voltages across those regions would be ignored.

Figures 2, 3:
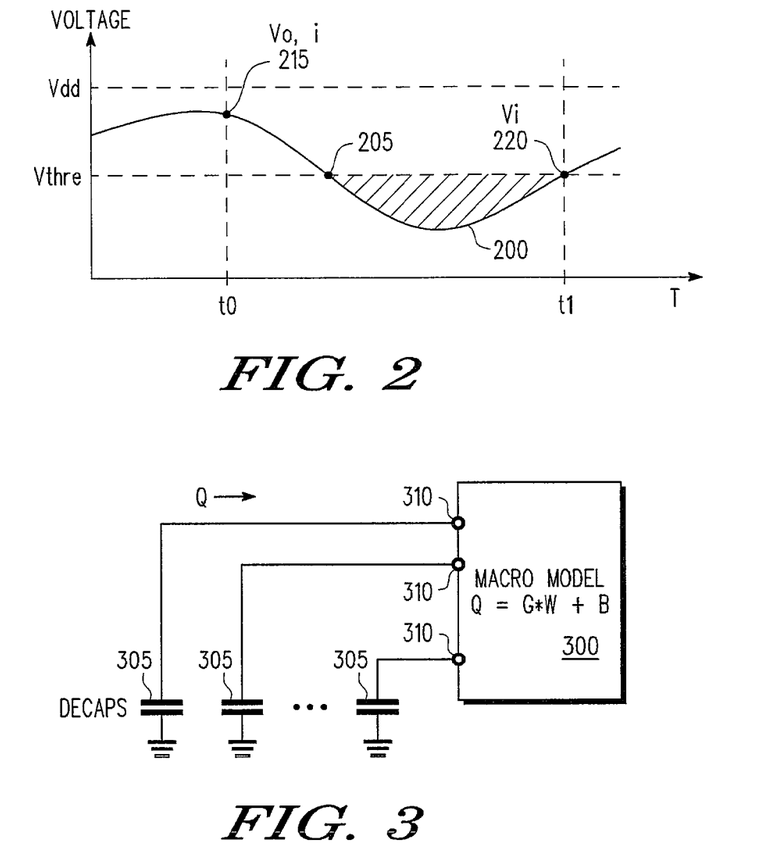
FIG. 2 is a diagram illustrating a sample worst voltage violation within a tile and a voltage violation time window according to preferred embodiments of the invention.
FIG. 3 is a functional block diagram illustrating a charge-based Macro model circuit with decaps according to preferred embodiments of the invention.

FIG. 2 illustrates a sampled voltage violation of network 100 within a tile 105 within a hot spot region 110 of FIG. 1. $V_{dd}$ is the maximum supply voltage and $V_{thre}$ is the user specified minimum threshold voltage for the network. The voltage violation area 200 is depicted as a sampled voltage $V_0$ 200 from a tile 105 that has dropped below the user specified minimum threshold voltage $V_{thre}$. A violation time window for a sampling node 107 (FIG. 1A) is determined from the voltage waveform $V_0$ at that node 107 obtained through the dynamic analysis of the power network 100. A violation time window is marked by two time instances: $t_0$, the time instance of maximum voltage 215 of V0 that occurs before a voltage violation 205 (where $V_0$ crosses and is then less than $V_{thre}$), and $t_1$, the time instance 220 when the voltage $V_0$ recovers back to the $V_{thre}$ level after voltage violation 205. The maximum voltage 215 at $t_0$ is assumed to be the initial voltage of the decap before it discharges. If there are multiple violation time windows, the optimization is performed to satisfy the charge transfer constraints (discussed in Section IV, above) for each of these violation time windows.

A few (preferably less than 10) sampling nodes 107 per tile 105 having the worst voltage violations are sampled to represent the behavior of all nodes 107 within those tiles 105. The size of tile 105 is kept small enough for this assumption to be valid. The remaining nodes 107 are abstracted away by macro modeling. The LP formulation, described below in Section IV, assumes that the entire decap value is added at the sampling node 107 within the tile 105 having the worst voltage violation. After solving the LP equation, however, the decap value to be added is distributed uniformly among the nodes 107 in the expanded violation region 120 to which the sampling node 310 of FIG. 3 belong.

FIG. 3 depicts a charge based mathematical macro model 300 of outer network 130 (FIG. 1) and includes resistors and pre-existing capacitors and inductors that are reduced to arrive at macro model 300. Sampling nodes 310, which correspond to selected sampling nodes 107 of FIG. 1A, are where the voltage $V_0$ is sampled and where decaps 305 are assumed to be connected once their value has been determined.

IV. Linear Programming (LP)—Based Decap Budgeting

The charge transfer equations corresponding to a violation time window are derived by integrating equation (4) over the violation time window, $[t_0, t_1]$, as follows:

$$\begin{bmatrix} G_{11} G_{12} \\ G_{12}^T G_{22} \end{bmatrix} \begin{bmatrix} \int_{t_0}^{t_1} U_1 \, dt \\ \int_{t_0}^{t_1} V \, dt \end{bmatrix} = \begin{bmatrix} \int_{t_0}^{t_1} J_1 \, dt \\ \int_{t_0}^{t_1} J_2 \, dt + \int_{t_0}^{t_1} I \, dt \end{bmatrix}.$$

Now, the macro modeling procedure, as described above in Section II, can be applied to obtain a charge-based macro model (schematically depicted in FIG. 3) of:

$$Q = A \cdot W + B \text{ where } Q \text{ is } \int_{t_0}^{t_1} I \, dt, A \text{ is } G22 - G_{12}^T G_{11}^{-1} G_{12}, \quad (5)$$

$$W \text{ is } \int_{t_0}^{t_1} V \, dt, \text{ and where } B \text{ is } \left( G_{12}^T G_{11}^{-1} \int_{t_0}^{t_1} J_1 \, dt - \int_{t_0}^{t_1} J_2 \, dt \right).$$

Note that Q represents the vector of total charges flowing through the sampling nodes 310 from the decaps 305 (FIG. 3) to the macro model network 300 during the time period $[t_0, t_1]$ and W (area W 410 of FIG. 4) represents the vector of average voltages of the sampling nodes 310 multiplied by the time duration $[t_0, t_1]$.

The system of equation (5) is a selected portion of the network 100 of FIG. 1, shown as macro model network 300 (FIG. 3), which has resistors (not shown) and pre-existing capacitors and inductors that are reduced to arrive at macro model 300. Decap(s) 305 to be added as external elements are connected to sampling nodes 310 of the macro model 300, as shown in FIG. 3. The decoupling capacitance budgeting problem thus reduces to optimizing the decaps 305 to be added at the sampling nodes 310 while providing sufficient charge to pull up the hot spot region 110 (FIG. 1) node voltages above $V_{thre}$ during the violation time windows. The macro model 300 (FIG. 3) is represented as Q=A·W+B.

Figure 4:
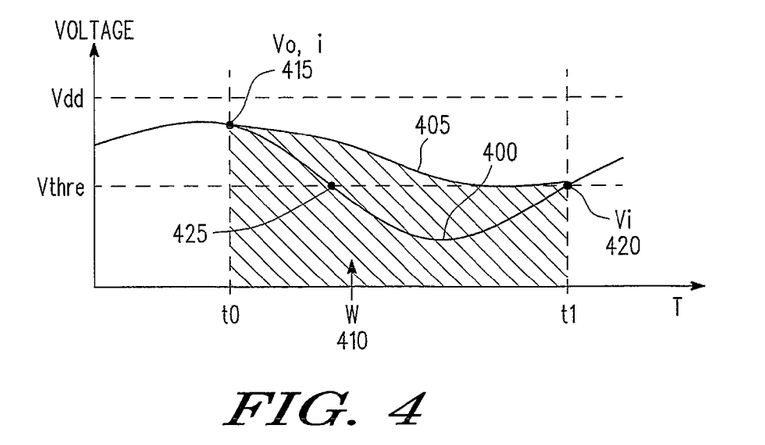
FIG. 4 is a diagram illustrating voltage waveforms in a hot spot region before and after adding decaps according to preferred embodiments of the invention.

FIG. 4 illustrates voltage waveforms $V_0$ at a sampling node 310 of macro model 300 (FIG. 3) before and after adding decaps 305. The objective of adding decaps 305 is to pull up the voltage $V_0$ to be greater than the user specified threshold voltage Vthre. In one waveform, violation voltage $V_0$ 400 is shown having a violation point 425 and a recovery point 420 between times $t_0$ and $t_1$. In another waveform of FIG. 4, corrected voltage $V_0$ 405 shows the effect of having decaps 305 added to the sampling nodes 310 of macro model 300 of FIG. 3. After decaps 305 are added, corrected voltage $V_0$ 405 maintains a voltage level greater than user specified threshold voltage $V_{thre}$.

To determine the voltage-based constraints, the charge equations (5) of the macro model 300 (FIG. 3) are now applied to the case where decaps 305 have been added, i.e. for the corrected voltage $V_0$ 405 in FIG. 4, area W 410 is determined by $$\int_{t0}^{t1} V\, dt.$$

In one embodiment, the corrected voltage $V_0$ 405 is approximated as a straight line between times $t_0$ and $t_1$, although other waveforms in other embodiments can also be used to approximate the corrected voltage $V_o$ 405. Using a method of straight-line approximation, the voltage-based constraints are written as:

$$W_i \geq (V_{o,i}+V_{thre})*(t_1-t_0)/2,\ i \in SP, \qquad (6)$$

where SP is the set of the sampling nodes 310 (FIG. 3), $$W_i \text{ is } \int_{t0}^{t1} V_i\, dt$$

for the i-th sampling node 310, and $V_{o,i}$ is the voltage of the i-th sampling node 310 at the start of the time window. These voltage-based constraints make another approximation, regarding sampled voltage $V_o$ obtained from the transient analysis before the addition of a decap 305. It is assumed that sampled voltage $V_0$ has not changed appreciably outside the violation time windows with the addition of decaps 305.

In the charge equations of the macro model equation (5), $Q_i$ is the charge flow from the i-th decap of sampling node 310 to the macro model 300 (FIG. 3). In order to keep the supply network voltage greater than $V_{thre}$, enough charge should be released from the decap 305. To keep the node of decap 305 itself above $V_{thre}$, the maximum charge that can be released from the decap 305 is $C_i \times (V_{o,i}-V_{thre})$. Therefore, there are the voltage constraints:

$$M \cdot C \geq A \cdot W + B, \qquad (7)$$

$$\text{where } M = \begin{bmatrix} V_{0,1} - V_{thre} \\ V_{0,2} - V_{thre} \\ \ldots \\ V_{0,m} - V_{thre} \end{bmatrix},\ \text{and } C = [C1, C2, \ldots, C_m]^T,$$

where $C_i$ is the decap 305 value at the i-th sampling node 310, and $V_{o,i}$ is the original voltage of the i-th sampling node 310. The $\circ$ operation represents Hadamard's product, (i.e., the entry-wise product of vectors M and C).

There are also constraints on capacitance to be considered. The decoupling capacitance being sought has to satisfy the capacitance constraints, which are specified for the tiles 105 (FIG. 1). After determining the value of decap 305 (FIG. 3) at the sampling nodes 310, the decaps 305 are uniformly distributed within the tiles 105 (FIG. 1) that have voltage violations and to which the sampling nodes 310 respectively belong. Therefore, if $C_{max,i}$ is the maximum amount of decap value allowed in the i-th tile 105 (FIG. 1), then:

$$(\Sigma C_k) \leq C_{max,i}, \qquad (8)$$

$k \in$ tile i where $C_{max,i}$ is decided by the capacitance density possible for a given technology and the amount of white space (i.e., empty space not containing any circuit block) available in a tile 105. When a region is made up of multiple tiles 105 and the placement of decaps 305 (FIG. 3) is used for a floor plan purpose of network 100 (FIG. 1), then a more complex set of constraints on capacitance can be derived from the floor plan constraints.

To determine the complete linear programming (LP) formulation, the following is accomplished by combining the following equations: the charge transfer constraints equation (7), the voltage based constraints equation (6), and the constraints on capacitance equation (8). Then, the decap budgeting problem for an expanded violation region 120 (FIG. 1) can be formulated into equation (9), as shown below:

minimize $\Sigma_{i \in SP} C_i$ (9)

subject to $M\_ \circ C \geq A \cdot W + B$ $W \geq L$ $\Sigma_{k \in \text{ tile } I} C_k \leq C_{max,i},\ \forall$ tile $i \in$ expanded violation region, where $m=|SP|$, $C=[C_1, C_2, \ldots, C_m]^T$, $$M\_ = \begin{bmatrix} V_{0,1} - V_1 \\ V_{0,2} - V_2 \\ \ldots \\ V_{0,m} - V_m \end{bmatrix},\ L = \begin{bmatrix} (V_{thre} - V_{0,1}) \times (t_1 - t_0) \\ (V_{thre} - V_{0,2}) \times (t_1 - t_0) \\ \ldots \\ (V_{thre} - V_{0,m}) \times (t_1 - t_0) \end{bmatrix},$$

where SP is the set of sampling nodes 310 of FIG. 3.

Assuming that $V_i$ reaches the threshold voltage $V_{thre}$ at time $t_1$, then $V_i$ is equal to $V_{thre}$ and $M\_$ is the same as M given in equation (7). Note that, in the above formulation, the elements of vector C are the only variables of optimization.

Figure 5:
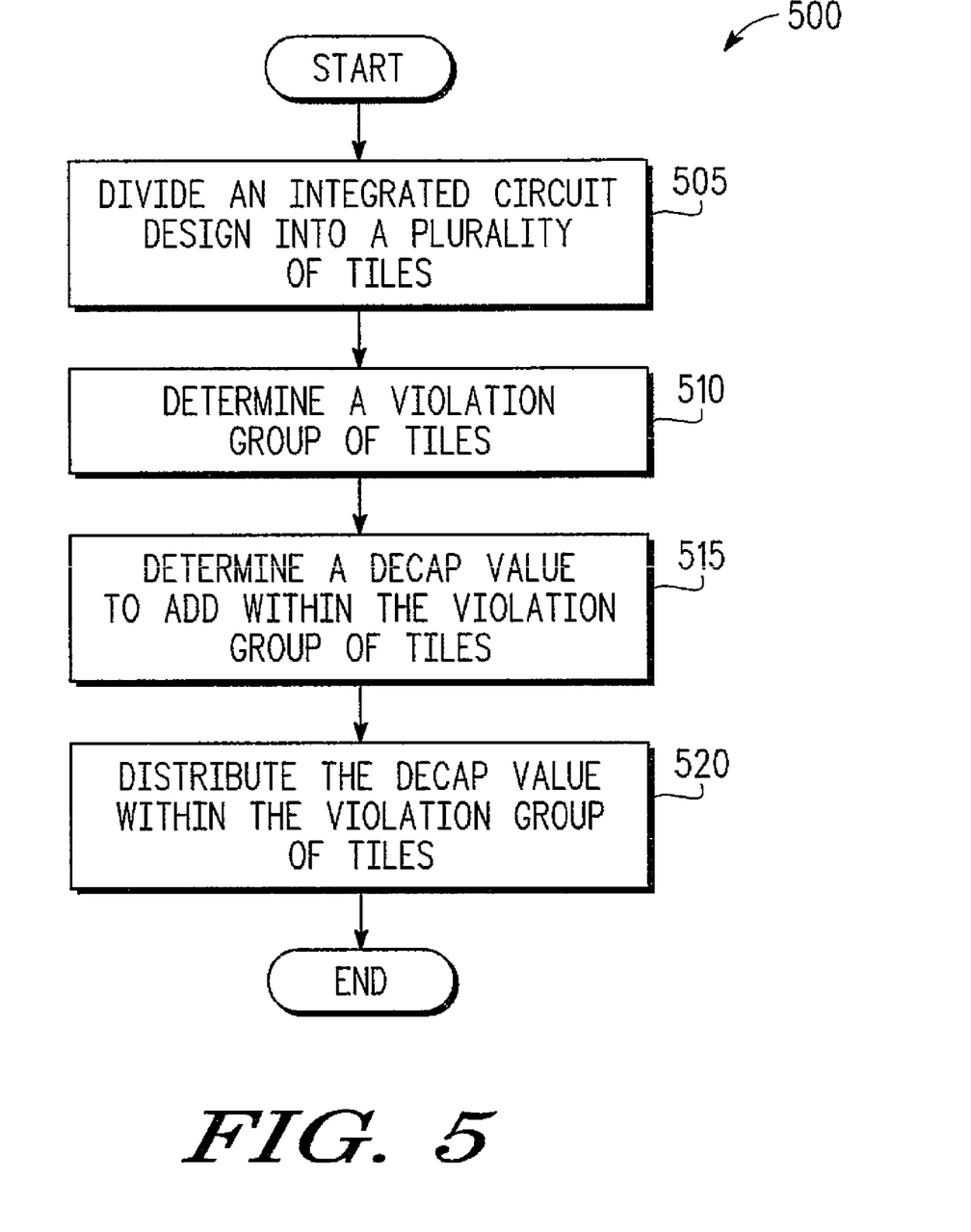
FIG. 5 is a flow diagram of a method of determining a decoupling capacitance according to preferred embodiments of the present invention.

Referring to FIG. 5, flow diagram 500 is depicted for a process to determine a decoupling capacitance according to preferred embodiments of the present invention. At block 505, an integrated circuit design is divided into a plurality of tiles 105 (FIG. 1). A violation group of tiles 125 within the integrated circuit design is determined at block 510. At block 515, a decap value is determined which is to be added within the violation group of tiles 125. The decap value is distributed with the violation group of tiles 125, at block 520 of the flow diagram 500.

V. Alternative Embodiments

In Section IV, it was assumed that the maximum charge that could be discharged from the i-th decap of decaps 305 (FIG. 3) is $C_i \times (V_{o,i}-V_{thre})$. This is true where the worst voltage $V_0$ of a sampling node 310 at $t_1$, denoted as $V_i$, is equal to threshold voltage $V_{thre}$. Actually, $V_i$ itself is dependent on decaps 305. Therefore, voltage constraints equation (7) can be rewritten as $$(V_{o,i}-V_i) \cdot C_i \geq \Sigma_{1 \leq k \leq m} A_{ik} W_k + B_i,\ \forall i \in SP \qquad (10).$$

Since both $V_i$ and $C_i$ are variables, voltage constraint equation (10) is no longer linear. To handle this nonlinearity, the following iterative steps are performed, wherein the linear programming optimization solution is found in each iteration:

Step 1. Set iteration count $p=0$ and the initial value $V_i^p$ based on the transient analysis results. Here $V_i^p$ represents the voltage $V_i$ in the p-th iteration. If $V_i^p < V_{thre}$, then set $V_i^p = V_{thre}$;

Step 2. Set $V_i^p \to V_i$, and determine the decap budget $C_i^p$ by solving the LP equation (9);

Step 3. Set $C^p_i \to C_i$, and get the new node voltage $V_i'$ by substituting Wi by $(V_i'+V_{o,1})\times(t_1-t_0)/2$, and then solving the following linear equations:

$$\begin{bmatrix} V_{0,1} - V_1' \\ V_{0,2} - V_2' \\ \ldots \\ V_{0,n} - V_m' \end{bmatrix} \times C_m = A \cdot \begin{bmatrix} (V_1 - V_{0,1}) \times T \\ (V_2 - V_{0,2}) \times T \\ \ldots \\ (V_m - V_{0,m}) \times T \end{bmatrix} + B, \quad (11)$$

where T is $(t_1-t_0)/2$. Note that the left hand side (LHS) of the above equations implies Backward Euler (BE) formulation of the decap, $C_i$. Here, $V_1' \times C_i$ is equivalent to $C/h \cdot x(t)$ of equation (2) and $V_{o,i} \times C_i$ is equivalent to $C/h \cdot x(t-h)$ of equation (2); and Step 4. Update $V_i^{p+1}$. Here, a step length σ is set to limit the solution space to be approximately $V_i^p$. If $V_1'$ is less than $V_{thre}$, then $V_1'$ is set to be equal to $V_{thre}$. The procedure can be described as follows:
if $V_i'-V_i^p$ is satisfactorily small, stop;
otherwise, if $V_i' < V_{thre}$, then $V_i^{p+1} = V_{thre}$;
otherwise, if $V_i' \leq V_i^p - \sigma$, then $V_i^{p-1} = V_i^p - \sigma$;
otherwise, if $V_i' \geq V_i^p + \sigma$, then $V_i^{p+1} = V_i^p + \sigma$;
otherwise, $V_i^{p+1} = V_i'$;
then, let p=p+1.

At this point, the first order Taylor series approximations of the nonlinear constraints equation (10) can be used to replace equation (9).

In another embodiment, the capacitance constraints can be relaxed initially and then tightened gradually. During the iterative linear programming procedure, the voltage of the sampling nodes 310 (FIG. 3) may vacillate up and down before settling down to a steady-state level. But, if the constraints on capacitance are tight to begin with, this may cause the optimization to become unrealizable, without a chance for recovery. Therefore, a relaxation factor can be added to relax the capacitance constraints and then the relaxation can be gradually withdrawn or reduced. With the relaxation factor, the objective of LP equation (9) thus becomes:

minimize $\Sigma_{i \in SP} C_i + \beta \cdot C_{relax}$ and the constraints on capacitance become:

$\Sigma_{k \in tile\ i} C_k \leq C_{max,i} + C_{relax}$, ∀ $tile_i \in$ violation region, where $C_{relax}$ is the relaxation factor and β is a weight factor. Generally, β is set to a very large number to force the capacitance constraints to be satisfied. By setting β, the relaxation factor also provides a trade-off between the capacitance constraints and the total capacitance required.

In another embodiment, non-uniform tiling of network 100 (FIG. 1) is used. Where there are multiple expanded violation regions 120 in a network 100, a uniform size tiling process may cause some problems. In some situations, some expanded violation regions 120 occupy a large area with a slow voltage gradient across the region while other violation regions 120 can occupy very little area with a large voltage gradient across the region. Given two nodes n1 and n2, the voltage gradient is defined as V(n1)−V(n2) divided by the physical distance between the two nodes.

When the voltage gradient is large, the voltage and current drawn at two closely located nodes 107 (FIG. 1A) could be quite different. As a result, all the nodes 107 in a tile 105 then cannot be represented well by a few sampling nodes 310 (FIG. 3). In that case, a very fine grain tiling may be used.

Typically, fine grain tiling uses tiles 105 (FIG. 1) defined as having a pitch of about 10 nm. However, the fine grain tiling will cause large expanded violation regions 120 to generate a very large LP problem. In view of this, non-uniformed tiling can be used. Fine grain tiling is applied to small-expanded violation regions 120 having a high voltage gradient, while coarse grain tiling is used for large expanded violation regions 120 having a small voltage gradient. Coarse grain tiling uses tiles 105 defined as having a pitch of about 100 to 200nm. The coarse and fine pitches can be either pre-fixed or user-defined.

A semiconductor device (not shown), and circuitry within the semiconductor device, can be manufactured in accordance with one or more of the decoupling capacitance budgeting methods described herein. In this way, supply noise within the circuitry, or network, of the semiconductor device would be optimally reduced.

As will be appreciated, the processes in preferred embodiments may be implemented using any combination of computer programming software, firmware or hardware. For example, an article of manufacture containing the computer programming code is used by either executing the code directly from the storage device, by copying the code from the storage device into another storage device such as a hard disk, RAM, etc., or by transmitting the code for remote execution. The method may be practiced by combining software and/or hardware to complete the steps of the preferred embodiment. An apparatus for practicing the preferred embodiment could be one or more computers and storage systems containing or having network access to computer program(s) coded in accordance with the preferred embodiment. A semiconductor device may be manufactured in accordance with the processes of preferred embodiments using design or test software which incorporates one or more of the processes in the preferred embodiments to determine decap values and/or the placement of those determined decap values in the circuitry of such a manufactured semiconductor device.

While the invention has been particularly shown and described with reference to preferred embodiments, it will be understood by those skilled in the art that various changes in form and detail may be made therein without departing from the spirit and scope of the preferred embodiment. Any variations, modifications, additions, and improvements to the embodiments described are possible and may fall within the scope of the invention as detailed within the following claims.

What is claimed is:

1. A computer readable storage article of manufacture having computer programming code disposed therein for determining decoupling capacitance (decap) to be added to a semiconductor circuit, said computer programming code when executed by a computer comprising:
   a) dividing an integrated circuit design layout into a plurality of rectangular tiles such that each of said plurality of tiles is of approximately equal area and includes a plurality of sampling nodes disposed entirely within;
   b) determining a core violation group of tiles of said plurality of tiles by sampling a voltage level at said plurality of sampling nodes disposed entirely within each of said plurality of tiles, whereby said core violation group of tiles includes less than all of said plurality of tiles of said integrated circuit design layout and includes only tiles of said plurality of tiles having sampling nodes having a sampled voltage waveform which includes a violation voltage level which is less than a specified threshold voltage level during a violation time period, wherein said violation time period begins at a first time instance $t_0$ when said sampled voltage waveform has a maximum voltage level which is greater than said specified threshold voltage level, such that said maximum voltage level is less than a maximum supply voltage level, and wherein said violation time period ends at a second time instance $t_1$ which occurs subsequent to said violation voltage level of said sampled voltage waveform when said sampled voltage waveform has recovered from said violation voltage level and is substantially equal to said specified threshold voltage level and is less than said maximum supply voltage level;

c) creating an expanded violation group of tiles which extends outwardly from said core violation group of tiles by a plural number of tiles in a direction away from said core violation group of tiles, and includes said entire core violation group of tiles, and includes tiles of said plurality of tiles of said integrated circuit design layout which are not included in said core violation group of tiles;

d) determining a value of decap to be added to said expanded violation group of tiles, including deriving charge transfer equations for said integrated circuit design by integrating modified nodal analysis (MNA) equations over said violation time period $[t_0, t_1]$, wherein said MNA equations model said integrated circuit design as a linear RLC network; and e) distributing substantially uniformly said decap value among said plurality of sampling nodes within said expanded violation group of tiles to provide a non-violation operating voltage at said plurality of sampling nodes of said expanded group of tiles to eliminate said violation voltage level at said plurality of sampling nodes of said core violation group of tiles, wherein said non-violation operating voltage at said plurality of sampling nodes of said core violation group of tiles is not less than said specified threshold voltage level.

2. The computer readable storage article of manufacture of claim 1, wherein said distributing of said decap value includes calculating an effective radius used to expand said core violation group of tiles by said plural number of tiles to form said expanded violation group of tiles.

3. The computer readable storage article of manufacture of claim 1, wherein a plurality of said sampling nodes disposed within each tile of said core violation group of tiles has a sampled voltage waveform which includes said violation voltage level during said violation time period.

4. The computer readable storage article of manufacture of claim 1, wherein said determining of said core violation group of tiles of said plurality of tiles is accomplished including sampling a voltage level at more than one said sampling node but less than 10 of said sampling nodes within each of said plurality of tiles of said integrated circuit design layout.

5. The computer readable storage article of manufacture of claim 1, wherein said determining said value of decap to be added is accomplished including determining a charge-based macro model of said determined violation group of tiles having the equation:

$$Q = A \cdot W + B, \text{ where } Q \text{ is } \int_{t0}^{t1} I\,dt, A \text{ is } G_{22} - G_{12}^T G_{11}^{-1} G_{12},$$

$$W \text{ is } \int_{t0}^{t1} V\,dt, \text{ where } B \text{ is } \left( G_{12}^T G_{11}^{-1} \int_{t0}^{t1} J_1\,dt - \int_{t0}^{t1} J_2\,dt \right),$$

where Q represents a vector of total charges flowing through said sampling nodes of said core violation group of tiles during said violation time period $[t_0, t_1]$, where W represents a vector of average voltages of said sampling nodes of said core violation group of tiles multiplied by a time duration of said violation time period $[t_0, t_1]$, where $J_1 dt$ and $J_2 dt$ are values of current sources in said macro model and kit represents current values in said macro model, and where $G_{12}$, $G_{11}$, $G_{22}$ are portions of an admittance matrix of said integrated circuit design layout.

6. The computer readable storage article of manufacture of claim 1, wherein said determining of said value of decap to be added is accomplished including determining charge-based constraints where a corrected operating voltage at each of said sampling nodes within said core violation group of tiles is greater than said specified threshold voltage level and is approximated as a straight-line waveform during said violation time period between said first time instance to and said second time instance $t_1$.

7. The computer readable storage article of manufacture of claim 1, wherein said distributing of said value of decap is accomplished such that said value of decap is distributed substantially uniformly among said sampling nodes of said expanded group of tiles to eliminate said violation voltage level at all said plurality of sampling nodes within said expanded violation group of tiles.

8. The computer readable storage article of manufacture of claim 1, wherein said dividing of said integrated circuit design layout into a plurality of rectangular tiles includes using fine grain tiling, and wherein said expanded violation group of tiles includes a high voltage gradient.

9. The computer readable storage article of manufacture of claim 1, wherein said core violation group of tiles each overlays at least a portion of a hot spot region which includes a plurality of said sampling nodes having said violation voltage level during said violation time periods.

10. The computer readable storage article of manufacture of claim 1, wherein said value of decap to be added is calculated including using a method of straight-line approximation for said non-violation operating voltage for said sampling nodes of said core violation group of tiles which includes:

$W_i \geq (V_{0,i} + V_{thre}) * (t_1 - t_0)/2$, $i \in SP$, where SP are said sampling nodes, $$W_i \text{ is } \int_{t0}^{t1} V_i\,dt$$

for an i-th sampling node of said plurality of sampling nodes, and $V_{0,i}$ is a value of a voltage of said i-th sampling node at said first time instance $t_0$ of said time violation period.

11. A semiconductor device designed using a computer having computer programming code disposed therein for determining decoupling capacitance (decap) to be added to said semiconductor device, said computer programming code when executed by said computer comprising:

a) dividing a semiconductor circuit design into a plurality of equally-sized rectangular tiles which each include a plurality of sampling nodes disposed entirely within each of said plurality of tiles;

b) determining a core violation group of tiles of said plurality of tiles by sampling a voltage level at said plurality of sampling nodes disposed entirely within each of said plurality of tiles, whereby said core violation group of tiles includes less than all of said plurality of tiles and includes only tiles of said plurality of tiles having sampling nodes having a sampled voltage waveform which includes a voltage level which is less than a specified threshold voltage level during a violation time period wherein said violation time period begins at a first time instance $t_0$ when said sampled voltage waveform has a maximum voltage level which is greater than said specified threshold voltage level, such that said maximum voltage level is less than a maximum supply voltage level, and wherein said violation time period ends at a second time instance $t_1$ which occurs subsequent to said violation voltage level of said sampled voltage waveform when said sampled voltage waveform has recovered from said violation voltage level and is substantially equal to said specified threshold voltage level and is less than said maximum supply voltage level;

c) creating an expanded violation group of tiles which extends outwardly from said core violation group of tiles by a plural number of tiles in a direction away from said core violation group of tiles, and includes said entire core violation group of tiles, and includes tiles of said plurality of tiles of said integrated circuit design layout which are not included in said core violation group of tiles:

d) calculating a value of decap to be added to said expanded violation group of tiles, including deriving charge transfer equations for said integrated circuit design by integrating modified nodal analysis (MNA) equations over said violation time period $[t_0, t_1]$, wherein said MNA equations model said integrated circuit design as a linear RLC network; and e) distributing substantially uniformly said decap value among said plurality of sampling nodes of said semiconductor circuit design within said expanded violation group of tiles to provide a non-violation operating voltage at said plurality of sampling nodes of said expanded group of tiles to eliminate said violation voltage level at said plurality of sampling nodes of said core violation group of tiles, wherein said non-violation operating voltage at said plurality of sampling nodes of said core violation group of tiles is not less than said specified threshold voltage level.

12. The semiconductor device of claim 11, wherein said calculating of said value of decap to be added is accomplished by determining a charge-based macro model of said determined violation group of tiles having the equation:

$$Q = A \cdot W + B, \text{ where } Q \text{ is } \int_{t_0}^{t_1} I\,dt, A \text{ is } G_{22} - G_{12}^T G_{11}^{-1} G_{12},$$

$$W \text{ is } \int_{t_0}^{t_1} V\,dt, \text{ where } B \text{ is } \left( G_{12}^T G_{11}^{-1} \int_{t_0}^{t_1} J_1\,dt - \int_{t_0}^{t_1} J_2\,dt \right),$$

where Q represents a vector of total charges flowing through said sampling nodes of said core violation group of tiles during said violation time period $[t_0, t_1]$, where W represents a vector of average voltages of said sampling nodes of said core violation group of tiles multiplied by a time duration of said violation time period $[t_0, t_1]$, where $J_1$ dt and $J_2$ dt are values of current sources in said macro model and dt represents current values in said macro model, and where $G_{12}, G_{11}, G_{22}$ are portions of an admittance matrix of said integrated circuit design layout.

13. The semiconductor device of claim 11, wherein said distributing of said decap value includes calculating an effective radius used to expand said core violation group of tiles by said plural number of tiles to form said expanded violation group of tiles.

14. The semiconductor device of claim 11, wherein a plurality of said sampling nodes disposed within each tile of said core violation group of tiles has a sampled voltage waveform which includes said violation voltage level during said violation time period.

15. The semiconductor device of claim 11, wherein said determining of said core violation group of tiles of said plurality of tiles is accomplished including sampling a voltage level at more than one said sampling node but less than 10 of said sampling nodes within each of said plurality of tiles of said integrated circuit design layout.

16. The semiconductor device of claim 11, wherein said determining of said value of decap is accomplished including determining charge-based constraints where a corrected operating voltage at each of said sampling nodes within said core violation group of tiles is greater than said specified threshold voltage level and is approximated as a straight-line waveform during said violation time period between said first time instance $t_0$ and said second time instance $t_1$.

17. The semiconductor device of claim 11, wherein said determining of said value of decap to be added is accomplished including determining charge-based constraints where a corrected operating voltage at each of said sampling nodes within said core violation group of tiles is greater than said specified threshold voltage level and is approximated as a straight-line waveform during said violation time period between said first time instance $t_0$ and said second time instance $t_1$.

18. The semiconductor device of claim 11, wherein said distributing of said value of decap is accomplished such that said value of decap is distributed substantially uniformly among said sampling nodes of said expanded group of tiles to eliminate said violation voltage level at all said plurality of sampling nodes within said expanded violation group of tiles.

19. The semiconductor device of claim 11, wherein said dividing of said integrated circuit design layout into a plurality of rectangular tiles includes using fine grain tiling, and wherein said expanded violation group of tiles includes a high voltage gradient.

20. The semiconductor device of claim 11, wherein said value of decap to be added is calculated including using a method of straight-line approximation for said non-violation operating voltage for said sampling nodes of said core violation group of tiles which includes:

$W_i \geq (V_{o,i} + V_{thre}) * (t_1 - t_0)/2, i \in SP$, where SP are said sampling nodes, $$W_i \text{ is } \int_{t_0}^{t_1} V_i\,dt$$

for an i-th sampling node of said plurality of sampling nodes, and $V_{o,i}$ is a value of a voltage of said i-th sampling node at said first time instance $t_0$ of said time violation period.

* * * * *